United States Patent [19]
Haddad et al.

[11] Patent Number: 5,765,949
[45] Date of Patent: Jun. 16, 1998

[54] THERMOCOUPLE MEASUREMENT DEVICE WITH IMPROVED INPUT GROUND CHARACTERISTICS

[75] Inventors: Michel Haddad; Al Becker; Bakul V. Damle, all of Austin, Tex.

[73] Assignee: National Instruments Corporation, Austin, Tex.

[21] Appl. No.: 770,009

[22] Filed: Dec. 19, 1996

[51] Int. Cl.$^6$ .................................................. G01K 7/10
[52] U.S. Cl. .................................................... 374/179
[58] Field of Search .................................. 374/127, 128, 374/172, 173, 179, 180, 181, 182

[56] References Cited

U.S. PATENT DOCUMENTS

| | | | |
|---|---|---|---|
| 3,211,001 | 10/1965 | Pettit | 374/181 |
| 3,688,580 | 9/1972 | Jarzembski | 374/182 |
| 3,924,470 | 12/1975 | Sander | 374/179 |
| 4,854,723 | 8/1989 | Her | 374/179 |

FOREIGN PATENT DOCUMENTS

| | | | |
|---|---|---|---|
| 52-41570 | 3/1977 | Japan | 374/181 |
| 63-163908 | 7/1988 | Japan | 374/179 |
| 3-9229 | 1/1991 | Japan | 374/179 |
| 920402 | 4/1982 | U.S.S.R. | 374/179 |

OTHER PUBLICATIONS

Applied Ideas—Acquisition and digitizing of singals proportional to temperature. Electrotechnology, vol. 8, No. 4 (Oct. 1980), p. 120.

*Primary Examiner*—G. Bradley Bennett
*Attorney, Agent, or Firm*—Conley, Rose & Tayon; Jeffrey C. Hood

[57] ABSTRACT

A method and apparatus for reducing the effects of ground loops in a thermocouple measurement device employing a differential amplifier for signal amplification. A resistor is coupled at the input of the differential amplifier to provide a DC ground reference. A capacitor is coupled in parallel to the resistor to compensate for AC noise and prevent the inputs from floating out of common mode range.

13 Claims, 2 Drawing Sheets

5,765,949

1

THERMOCOUPLE MEASUREMENT DEVICE WITH IMPROVED INPUT GROUND CHARACTERISTICS

FIELD OF THE INVENTION

The present invention relates to thermocouples, and particularly to thermocouple measuring devices having differential input amplifiers that are indifferent to whether the thermocouple is grounded or floating.

DESCRIPTION OF THE RELATED ART

A thermocouple is created whenever two dissimilar metals touch. The junction between the two metals generates a small voltage as a function of temperature. This thermoelectric voltage is known as the Seebeck voltage (after Thomas Seebeck who discovered it in 1821). The voltage is approximately linear for small changes in temperature and is given by $\Delta V = S \Delta T$, where $\Delta V$ is the change in voltage, $S$ is the Seebeck coefficient and $\Delta T$ is the change in temperature.

Because of the low output voltage that is characteristic of thermocouples, a thermocouple measuring device includes an amplifier which is used to amplify the signal to a sufficient level that it can be read and processed by other circuitry. Typically an isolation amplifier is used. As is well-known, an isolation amplifier is a device for coupling a signal from a circuit with one ground reference to another circuit with a different ground. This ensures that the user need not worry about the creation of a ground loop, which is created when there is a potential difference between two grounds. The ground loop may cause inaccurate representation of the acquired signal or, if large enough, may damage the measurement system. While the isolation amplifier obviates concern about creating a ground loop, isolation amplifiers are typically relatively large, complex, inaccurate and expensive devices.

Accordingly, some thermocouple measuring device manufacturers provide a differential amplifier in place of the isolation amplifier. If a differential amplifier is employed, steps must be taken to decrease common mode coupling and to ensure that the device remains linear. Although a differential amplifier can provide good common mode rejection, the inputs must be grounded because floating the inputs can cause the amplifier to exit the range necessary for linear operation. However, if the thermocouple is already grounded, insertion of an additional ground will produce a ground loop. Consequently, when a differential amplifier is employed, the manufacturer must require the customer to know whether the thermocouple is already grounded or whether it needs a ground. This typically is a problem for customers who may not understand the problem and may not read their instruction manual prior to using the thermocouple.

SUMMARY OF THE INVENTION

It is an object of the invention to provide an improved thermocouple measuring device having a differential amplifier as the conditioning amplifier.

It is a further object of the invention to provide a thermocouple measuring device having a differential amplifier wherein the user need not be concerned with whether or not the input is grounded.

It is a still further object of the invention to provide a differential amplifier input for a thermocouple, which is insensitive to AC coupled noise.

In accordance with one aspect of the claimed invention, the present invention comprises a thermocouple temperature measuring circuit employing a differential amplifier rather than an isolation amplifier as the conditioning amplifier. In order to avoid creation of ground loops during measurement, the present invention includes a grounding resistor at the input of the differential amplifier. In order to prevent AC coupled noise from driving the inputs out of common mode range, a capacitor is provided in parallel with the resistor at the differential amplifier's input.

BRIEF DESCRIPTION OF THE DRAWINGS

A better understanding of the present invention can be obtained when the following detailed description of the preferred embodiment is considered in conjunction with the following drawings, in which.

Figure 1:
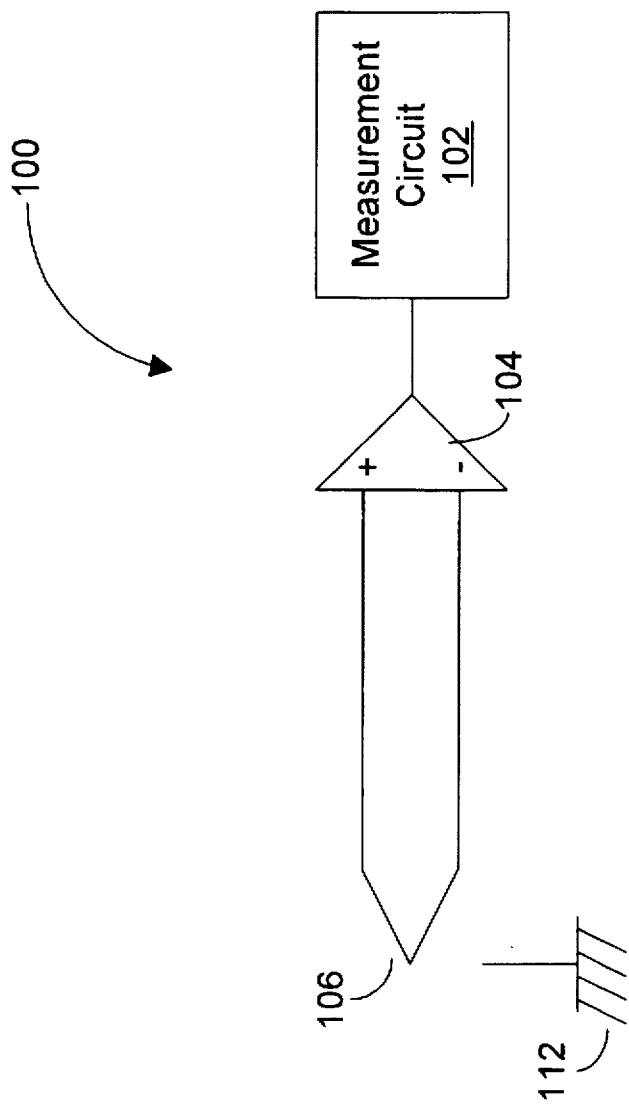
FIG. 1 illustrates a thermocouple input circuit employing a differential amplifier according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings and with particular attention to FIG. 1, a thermocouple input circuit employing a differential amplifier according to the prior art is shown. Thermocouple input circuit 100 includes a measurement circuit 102, coupled to a differential amplifier 104. Differential amplifier 104 is coupled at its inputs to thermocouple sensor node 106. Because the differential amplifier inputs cannot be allowed to float, a ground 112 may be provided. In order to prevent ground loops, however, the user is required to know whether thermocouple node 106 is grounded or whether the user himself needs to provide a ground. If a ground loop is caused by having differential grounds, offsets in measurement may result.

Figure 2:
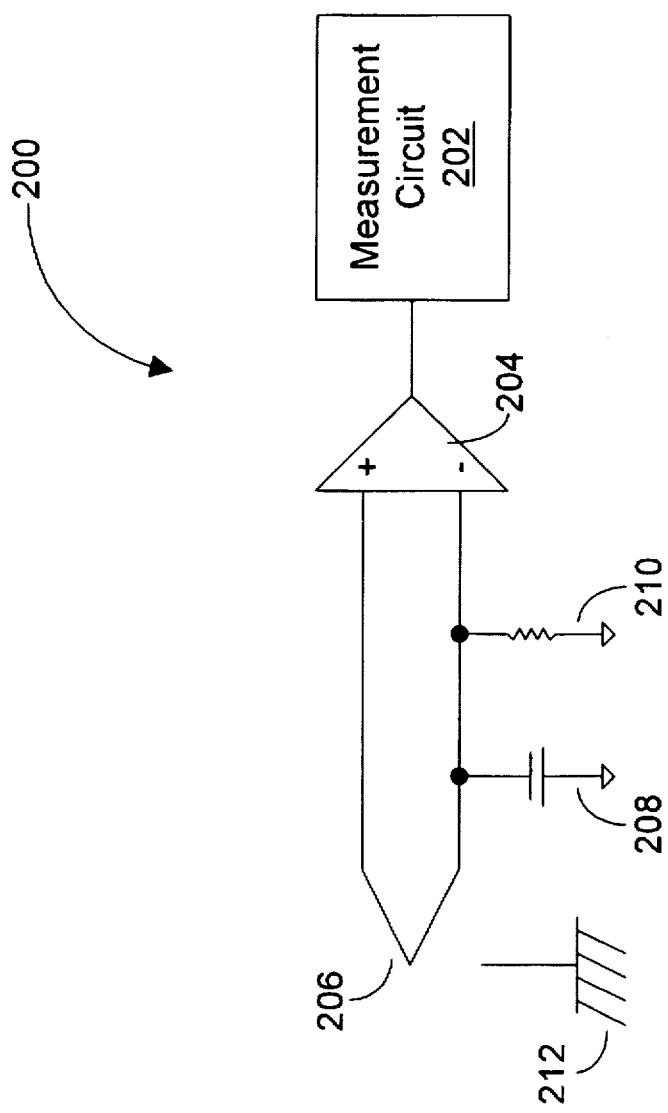
FIG. 2 illustrates a thermocouple input circuit according to one embodiment of the present invention.

Turning now to FIG. 2, a thermocouple input circuit 200 employing a differential amplifier according to the present invention is shown. In the thermocouple input circuit 200 of the present invention, the user is not required to determine whether or not the thermocouple is grounded or floating. More particularly, thermocouple input circuit 200 includes a measurement circuit 202 coupled to a differential amplifier 204. A thermocouple measurement node 206 is coupled to the inputs of differential amplifier 204. A ground 212 may be provided at thermocouple measurement node 206. A large resistor 210 is coupled to either the inverting or non-inverting input of differential amplifier 204. Resistor 210 is preferably on the order of about one to ten megaohms (M$\Omega$). The specific value is not important. It is sufficient that resistor 210 have sufficient resistance to provide a defined grounding. More generally, the input node need not be grounded. The thermocouple node could be at any fixed voltage reference that doesn't cause the differential amplifier to exceed common mode range. The nature of differential amplifier 204 is such that it has very high impedance inputs. Accordingly, compared to the differential amplifier impedance, resistor 210 appears like a ground. In the thermocouple input circuit 200 of the present invention, ground 212 is not required (i.e., the thermocouple input circuit 200 operates properly in the absence of a ground). However, if ground 212 were connected to thermocouple input node 206, then only a small amount of current would flow through resistor 210 and the resulting error would be relatively small. Therefore, the present invention operates regardless of the presence or absence of the ground 212. Thus a user is no longer required to have knowledge regarding whether a ground is or is not required.

While this configuration is sufficient for DC, it is inadequate to compensate for AC noise, which couples capacitively. Accordingly, a capacitor 208 is coupled in parallel with resistor 210. Again, the precise value of the capacitor 208 is unimportant. However, in a preferred embodiment, capacitor 208 is on the order of about 0.01 microfarad. Capacitor 208 provides a very strong AC ground for AC noise without creating DC ground loops. More particularly, use of capacitor 208 insures that large AC coupled noise voltages do not drive the inputs out of common mode range. The AC noise will be present and may be seen in measurements, but it will typically be rejected by the differential amplifier and amplifying circuitry. More particularly, the differential amplifier and/or the amplifying circuitry may include a normal or common mode rejection filter to reject this normal mode AC noise. While the use of the circuit degrades the common mode rejection of the circuit, the capacitor keeps the inputs within the common mode range, even in the presence of significant noise. In this fashion, the user no longer has to know whether or not to ground. The user is able to simply take a reading without knowing whether or not a ground is present.

Numerous variations and modifications will become apparent to those skilled in the art once the above disclosure is fully appreciated. It is intended that the following claims be interpreted to embrace all such variations and modifications.

We claim:

1. A thermocouple measuring device, comprising:
   a temperature sensitive measurement node;
   a differential amplifier including inputs coupled to said temperature sensitive measurement node, wherein said differential amplifier includes outputs for coupling to a thermocouple measuring circuit;
   a capacitor connected to a first input of said differential amplifier; and
   a resistor connected in parallel with the capacitor to the first input of the differential amplifier, wherein said resistor operates to provide a ground reference.

2. The thermocouple measuring device of claim 1, wherein said resistor has a resistance of not less than about 1 MΩ.

3. The thermocouple measuring device of claim 2, wherein said capacitor has a capacitance of about 0.01 microfarads.

4. The thermocouple measuring device of claim 1, wherein said ground reference is a predetermined voltage reference.

5. A thermocouple measuring device adapted for coupling to a thermocouple measurement circuit comprising:
   means for converting a sensed temperature to an electrical signal;
   means coupled to said converting means including a differential amplifier for amplifying said electrical signal wherein said differential amplifier includes an output for coupling to a measurement circuit, and an input coupled to said converting means; and
   means coupled to said converting means and said amplifying means for preventing ground loops.

6. The thermocouple measuring device of claim 5, wherein said ground loop preventing means includes a resistor coupled at an input of said differential amplifier.

7. The thermocouple measuring device of claim 6, wherein said ground loop preventing means includes means for compensating for AC noise.

8. The thermocouple measuring device of claim 7, wherein said compensating means includes a capacitor connected in parallel to said resistor.

9. A thermocouple measuring device comprising:
   a temperature sensor;
   a differential amplifier, including a first input and second input, coupled to the temperature sensor, wherein said differential amplifier includes an output;
   a measurement circuit coupled to said output;
   a signal conditioning circuit coupled to said thermocouple measuring circuit;
   a resistor coupled to a first input of said differential amplifier, wherein said resistor provides a ground reference; and
   a capacitor coupled in parallel to said resistor, wherein said capacitor prevents said first and second inputs of said differential amplifier from floating out of common mode range.

10. The thermocouple measuring device of claim 8, wherein said resistor has a resistance of about 1 MΩ.

11. The thermocouple measuring device of claim 9, wherein said capacitor has a capacitance of about 0.01 microfarad.

12. The thermocouple measuring device of claim 11, wherein said ground reference is a predetermined voltage reference.

13. The thermocouple measuring device of claim 11, wherein said differential amplifier includes a normal mode rejection filter to reject normal mode AC noise.

* * * * *